(12) United States Patent
Ise (10) Patent No.: US 11,716,441 B2
(45) Date of Patent: Aug. 1, 2023

(54) ELECTRONIC APPARATUS ALLOWING DISPLAY CONTROL WHEN DISPLAYING DE-SQUEEZED IMAGE, AND CONTROL METHOD OF ELECTRONIC APPARATUS

(71) Applicant: CANON KABUSHIKI KAISHA, Tokyo (JP)

(72) Inventor: Toshimichi Ise, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 26 days.

(21) Appl. No.: 17/143,906

(22) Filed: Jan. 7, 2021

(65) Prior Publication Data

US 2021/0218928 A1  Jul. 15, 2021

(30) Foreign Application Priority Data

Jan. 14, 2020 (JP) .................. 2020-003627

(51) Int. Cl.
| | |
|---|---|
| *H04N 7/01* | (2006.01) |
| *G06T 5/00* | (2006.01) |
| *G06T 3/40* | (2006.01) |
| *H04N 23/55* | (2023.01) |
| *H04N 23/80* | (2023.01) |

(52) U.S. Cl.
CPC ............ *H04N 7/0122* (2013.01); *G06T 3/40* (2013.01); *G06T 5/006* (2013.01); *H04N 23/55* (2023.01); *H04N 23/80* (2023.01)

(58) Field of Classification Search
CPC ............... H04N 7/0122; H04N 5/2254; H04N 5/23229; H04N 5/23206; G06T 3/40; G06T 5/006; G06T 3/00
USPC ........................................................ 348/241
See application file for complete search history.

(56) References Cited

U.S. PATENT DOCUMENTS

| | | | | |
|---|---|---|---|---|
| 5,502,486 A | * | 3/1996 | Ueda ..................... | H04N 5/9206 386/E5.069 |
| 2002/0181784 A1 | * | 12/2002 | Shiratani ................ | G06T 11/60 382/218 |
| 2013/0016255 A1 | * | 1/2013 | Bhatt ....................... | G06T 3/40 348/240.2 |
| 2018/0063445 A1 | * | 3/2018 | Ogaki .................. | H04N 5/2628 |

FOREIGN PATENT DOCUMENTS

JP          2018037859 A       3/2018

\* cited by examiner

*Primary Examiner* — Stephen P Coleman
(74) *Attorney, Agent, or Firm* — Canon U.S.A., Inc. IP Division (57) ABSTRACT

An apparatus includes a control unit configured to display a first item with a first image, which is an image that is captured by a capturing unit and is not de-squeezed, wherein the first item being an item indicating a region of the first image corresponding to a region having a predetermined aspect ratio of a second image that is an image obtained by de-squeezing the first image, wherein the region indicated by the first item does not have the predetermined aspect ratio.

20 Claims, 6 Drawing Sheets

FIG.4A
CONVENTIONAL METHOD

FIG.4B
PROPOSED METHOD

ELECTRONIC APPARATUS ALLOWING DISPLAY CONTROL WHEN DISPLAYING DE-SQUEEZED IMAGE, AND CONTROL METHOD OF ELECTRONIC APPARATUS

BACKGROUND OF THE DISCLOSURE

Field of the Disclosure

The aspect of the embodiments relates to a display control technique used when displaying a de-squeezed image.

Description of the Related Art

In recent years, cameras for professional use include a camera equipped with a function of electronically reversing the horizontal compression of (de-squeezing) an image captured by an anamorphic lens. The anamorphic lens is a special lens that forms a horizontally compressed optical image of an object when capturing the object image. By capturing an image formed by the anamorphic lens and de-squeezing the image during, for instance, a post process, it is possible to obtain a horizontally long image (e.g., CinemaScope (registered trademark) image with an aspect ratio of 2.39:1).

The anamorphic lens, due to intrinsic characteristics thereof, causes distortion at left and right ends of a captured image before de-squeezing. To deal with this, a technique is known in which a part of the horizontally compressed image is cut out and horizontally stretched, then output to a display medium as a de-squeezed image, with sides thereof having been cut off (Japanese Patent Application Laid-open No. 2018-037859). However, since an amount of distortion caused by the anamorphic lens differs largely between the center and vicinities of left- and right-ends of the image, the object cannot be represented correctly at the left and right ends by simple horizontal stretching. Hence, in Japanese Patent Application Laid-open No. 2018-037859, side parts are cut off and the central part of the image, where the image is less affected by the distortion when stretched, is cut out.

Here, it is conceivable that a camera that outputs an image to a plurality of output targets (output systems) is equipped with a function that allows switching between ON and OFF of de-squeeze for each output target. In the case where de-squeezing is switched on and off for each output target, there is an issue of difficulty in specifically identifying a limit of an image range (e.g., CinemaScope image range limit) that is to be finally obtained (after de-squeezing) at the output targets for which de-squeeze setting is OFF.

SUMMARY OF THE DISCLOSURE

An apparatus comprising:
a display control unit configured to display a first item with a first image, which is an image that is captured by an image capturing unit and is not de-squeezed, wherein the first item being an item indicating a region of the first image corresponding to a region having a predetermined aspect ratio of a second image that is an image obtained by de-squeezing the first image,
wherein the region indicated by the first item does not have the predetermined aspect ratio.

Further features of the disclosure will become apparent from the following description of exemplary embodiments with reference to the attached drawings.

DESCRIPTION OF THE EMBODIMENTS

An exemplary embodiment of the disclosure will be described in detail below with reference to the accompanying drawings. It is to be noted that the following exemplary embodiment is merely one example for implementing the disclosure and can be appropriately modified or changed depending on individual constructions and various conditions of apparatuses to which the aspect of the embodiments is applied. Thus, the disclosure is in no way limited to the following exemplary embodiment.

Figure 1:
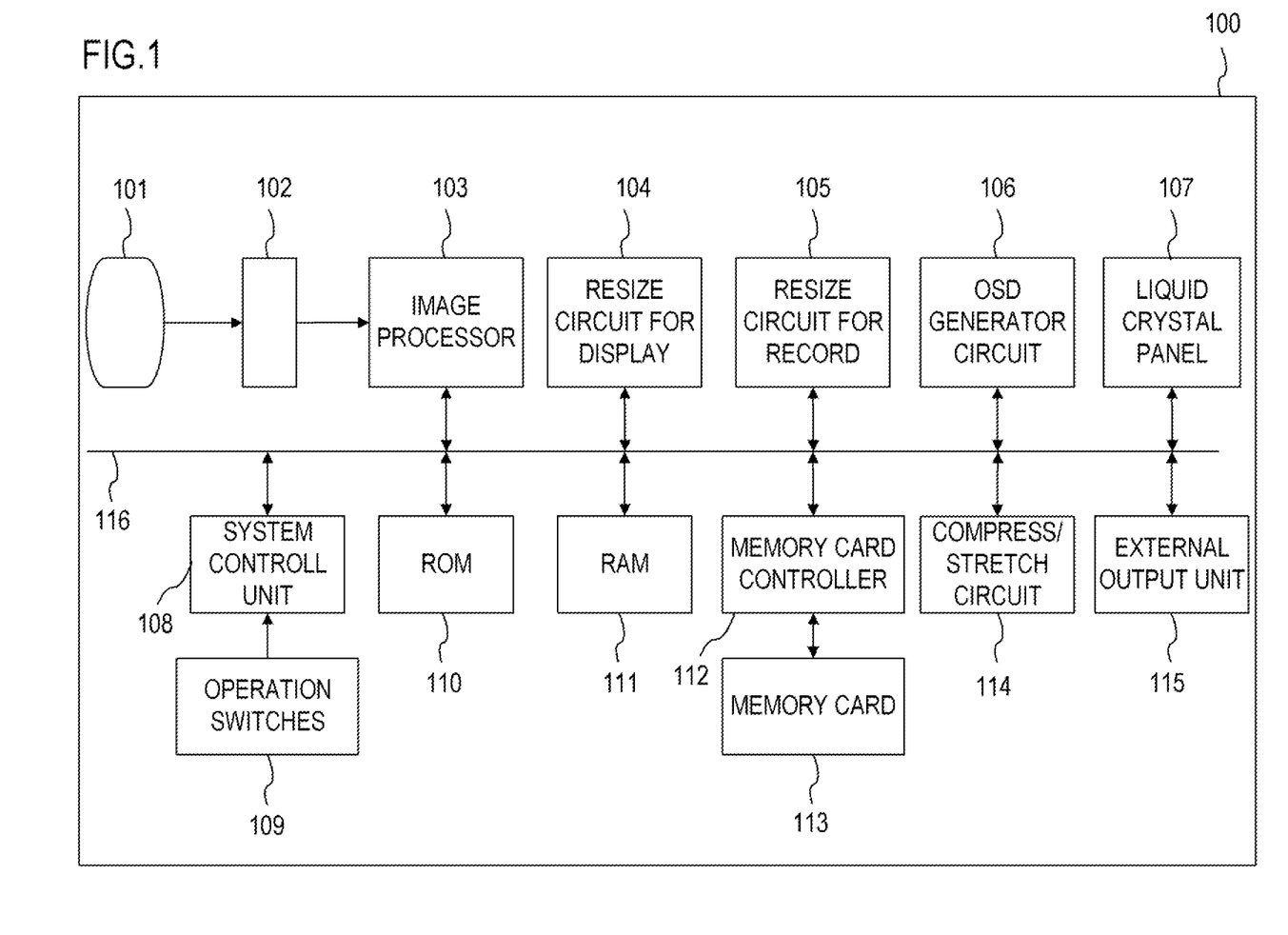
FIG. 1 is a configuration diagram of an imaging apparatus according to the embodiment.

FIG. 1 is a configuration diagram of an imaging apparatus 100 (apparatus) according to the embodiment.

Lens unit 101 is an optical system made up of fixed lenses for collecting light, zoom lenses, an aperture, correction lenses (lenses having both functions of correcting the image-forming position that has moved with a movement of the zoom lenses, and of adjusting the focal point), and so on. The lens unit 101 forms an image of an object on an image-forming plane of an image sensor 102 to be described later.

The image sensor 102 is an image pickup element that converts light into electrical charges to generate an image signal, and may be a CCD image sensor or a CMOS image sensor, for example. The generated image signal is output to an image processor 103. The image pickup element may be of a dual pixel type in which all the pixels on the image-forming plane are each formed by a pair of photoreceptors, these pairs of photoreceptors being capable of photoelectric conversion of pairs of optical images formed by micro lenses in respective pixels.

The image processor 103 converts the image signal output by the image sensor 102 into RAW data (RAW image). The image processor 103 performs RAW development processing such as interpolation, image quality adjustment, etc., to the converted RAW data and generates YUV format image data corresponding to the RAW data. The image processor 103 stores the generated YUV format image data in RAM 111 to be described later.

A resize circuit for display 104 performs resizing and de-squeezing to be described later to the YUV format image data stored in the RAM 111 to generate image data to be displayed. The resize circuit for display 104 stores the generated image data to be displayed in the RAM 111.

A resize circuit for record 105 performs resizing to the YUV format stored in the RAM 111 to generate image data to be recorded. The resize circuit for record 105 stores the generated image data to be recorded in the RAM 111.

OSD generator circuit 106 is a circuit that generates an on-screen display (OSD). Specifically, the OSD generator circuit 106 generates OSD data such as various settings menus, titles, time, and so on. The OSD generator circuit 106 stores the generated OSD data in the RAM 111. The OSD data is combined with the image data to be displayed stored in the RAM 111, and is displayed on a liquid crystal panel 107 that is a display unit, or is output to an external device via an external output unit 115 to be described later.

The liquid crystal panel 107 is a display unit for showing the image data to be displayed or OSD. The display unit is not limited to the liquid crystal panel and may be of other types such as an organic EL panel.

System control unit 108 is a control unit, for example a microcomputer, which controls the entire imaging apparatus 100. The system control unit 108 can also be understood as a display control unit that controls the display of images in the imaging apparatus 100 or an external device.

Operation switches 109 are switches that receive operations by the user. The operation switches 109 include a switch for selecting one of a camera mode that allows camera shooting, a play mode for playback of images, and a power OFF mode for turning off the power.

ROM 110 is a flash ROM, where programs and the like executed by the system control unit 108 are stored. Some areas of the ROM 110 are used for retaining a state or the like of the system as a back-up.

RAM 111 is a volatile memory used by the system control unit 108, image processor 103, a compress/stretch circuit 114 and others as a work memory.

A memory card controller 112 records moving image data and the like in accordance with a format compatible with a computer such as a FAT file system in a memory card 113. The memory card 113 is a detachable recording medium of the imaging apparatus 100 and can be mounted to other devices than the imaging apparatus 100 such as a PC.

The compress/stretch circuit 114 encodes the image data stored in the RAM 111 (e.g., MPEG compression) to generate moving image data or the like and outputs the same to the RAM 111.

The external output unit 115 is an interface for allowing output of the image data to be displayed to an external device (output unit of HDMI (registered trademark), SDI and the like). The external output unit 115 allows output of signals (image data to be displayed) at 4K60P, 2K60P or other specifications.

Bus 116 is a bus for sending and receiving data among various units of the imaging apparatus 100.

Figure 2:
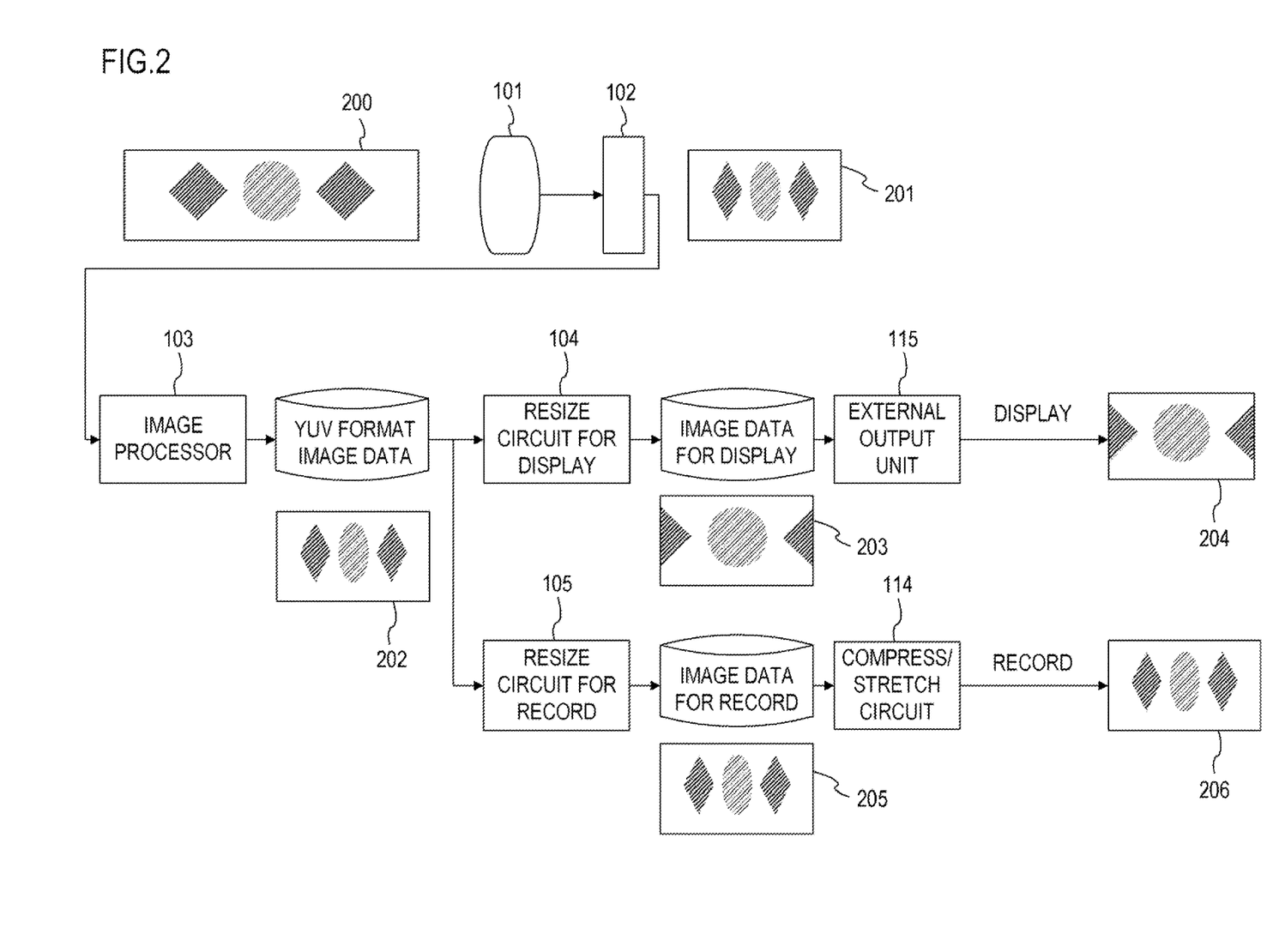
FIG. 2 is a diagram illustrating an example of a process of generating image data according to the embodiment.

FIG. 2 is a diagram illustrating an example of a process of generating image data in the imaging apparatus 100. Here, the lens unit 101 is an anamorphic lens having a vertical/horizontal compression ratio of 1:2.

An image captured by the anamorphic lens (first image) is a distorted image, having been squeezed (shrunk) by 1/1.33 or ½ horizontally in accordance with the squeeze ratio (at which the image is to be shrunk) of the lens being used. Such optical compression enables capturing of an image of an angle of view that is horizontally wider than that of an image the sensor is able to capture. A CinemaScope image can be obtained by de-squeezing (stretching) the image captured by the anamorphic lens by 1.33 times or two times horizontally (de-squeeze ratio) in accordance with the squeeze ratio of the anamorphic lens that was used.

Object image 200 is an image of the object captured by the imaging apparatus 100. The image sensor 102 forms an image of the object 200 in a state compressed by the lens unit 101 with the vertical/horizontal compression ratio of 1:2, and converts the light into an electrical signal (image signal 201). The image signal 201 converted from light undergoes various image processing by the image processor 103 and is stored in the RAM 111 as YUV format image data (image data 202). The YUV format image data stored in the RAM 111 undergoes the de-squeeze process to be described later by the resize circuit for display 104, and is stored in the RAM 111 as image data to be displayed (image data 203). The stored image data to be displayed is output externally (to an external device) via the external output unit 115 (image data 204). Alternatively, the image data to be displayed may be output to the liquid crystal panel 107. In this embodiment, the de-squeezing feature can be turned on or off by a user operation for each output target.

The YUV format image data stored in the RAM 111 is resized to a size for record by the resize circuit for record 105, and stored in the RAM 111 as image data to be recorded (image data 205). The stored image data to be recorded is compressed by the compress/stretch circuit 114, and recorded in the memory card 113 (image data 206) via the memory card controller 112.

Figure 3:
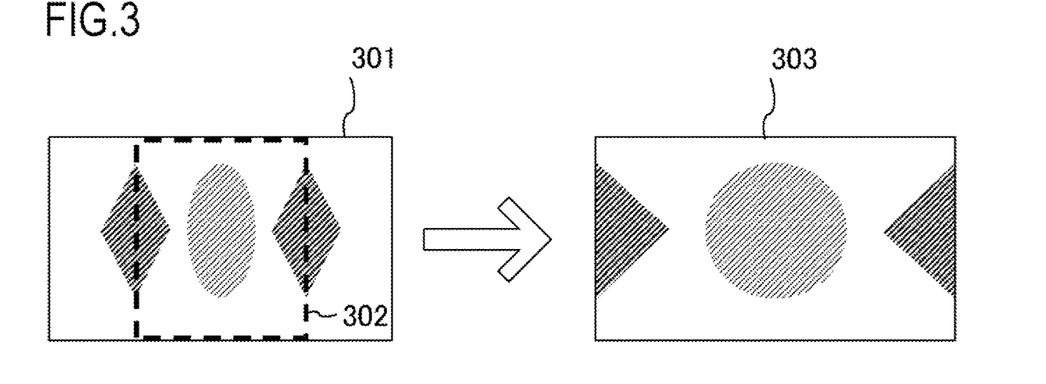
FIG. 3 is a diagram illustrating an example of a de-squeeze process according to the embodiment.

FIG. 3 is a diagram illustrating an example of the de-squeeze process according to the embodiment. Image data 301 represents the YUV format image data input to the resize circuit for display 104. The resize circuit for display 104 stretches an area ¼ to ¾ from the left edge of the image data 301 (area 302) two times horizontally to generate image data to be displayed 303 (second image). The de-squeeze process produces an image with a vertical/horizontal compression ratio of 1:1 from the image captured by the lens unit 101. The de-squeeze process can also be understood as a process of changing the aspect ratio of an image.

Figure 4A:
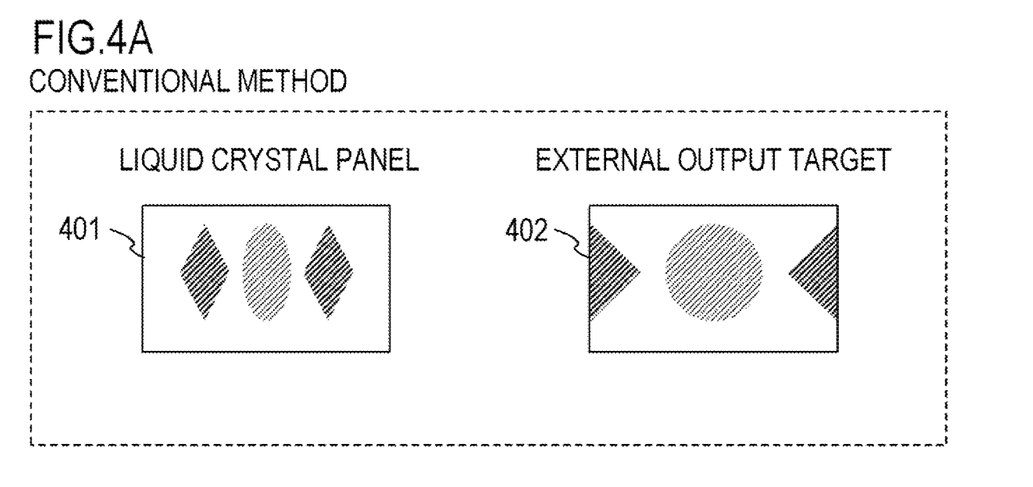
FIG. 4A and FIG. 4B are diagrams illustrating display images according to the embodiment.
Figure 4B:
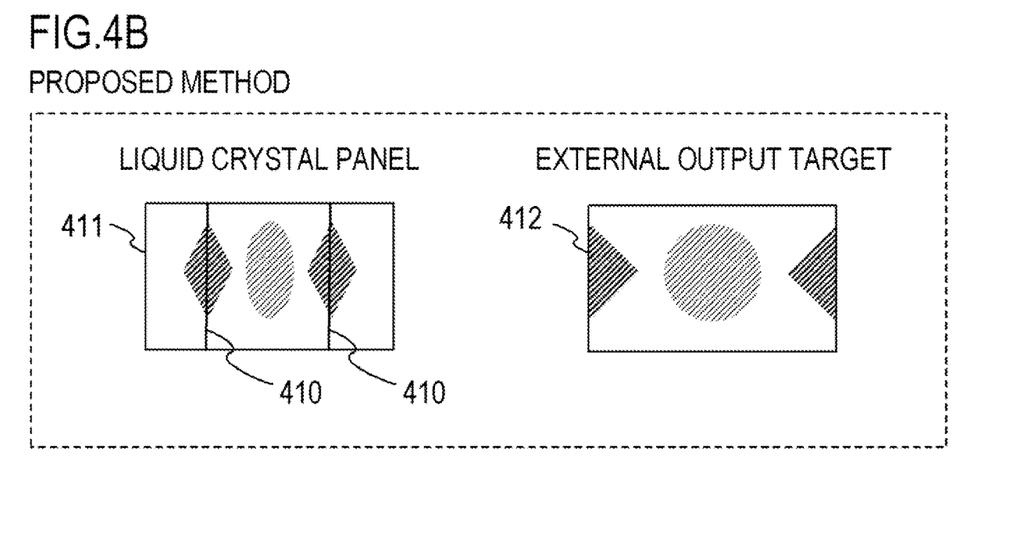

FIG. 4A and FIG. 4B are diagrams illustrating the screen displayed on the liquid crystal panel 107 and the screen displayed on an external device (via the external output unit 115). The type of output target is not limited to the liquid crystal panel 107 or external device. The data may be output to anywhere by EVF or wireless transmission, for example. There may be a plurality of output targets of the same type.

FIG. 4A illustrates an example in which an existing method is applied to show a screen 401 (screen that displays an image that has not been de-squeezed) on the liquid crystal panel 107, and a screen 402 (screen that displays an image that has been de-squeezed) on the external device. It is not clear from the screen 401 displayed on the liquid crystal panel 107 alone which area of the screen 401 will be included in the CinemaScope when de-squeezed (hereinafter to be referred to as valid region of CinemaScope (valid area)).

FIG. 4B illustrates an example in which the method of this embodiment is applied to show a screen 411 (screen that displays an image that has not been de-squeezed) on the liquid crystal panel 107, and a screen 412 (screen that displays an image that has been de-squeezed) on the external device. Unlike the screen 401, the screen 411 shows anamorphic markers 410 as OSD. The anamorphic markers 410 are an item that indicates the valid region of CinemaScope (first item). Namely, the anamorphic markers 410 are indicators that indicate the region which, after being de-squeezed, will have an aspect ratio of 2.39:1. Therefore, the region indicated by the anamorphic markers 410 on the screen 411 has a different aspect ratio from 2.39:1. For example, the anamorphic markers 410 indicate a region with an aspect ratio of 1.195:1 (or 2.39:2) if the image is to be de-squeezed two times horizontally. This makes it readily recognizable which area of the image that is not de-squeezed yet will be the valid region of CinemaScope when de-squeezed as shown on the screen 411.

Next, an example of processing for displaying anamorphic markers 410 will be described with reference to the flowchart of FIG. 5. Each step of the processing in this flowchart is realized by the system control unit 108 deploying a program stored in the ROM 110 to the RAM 111 and executing it.

Figure 5:
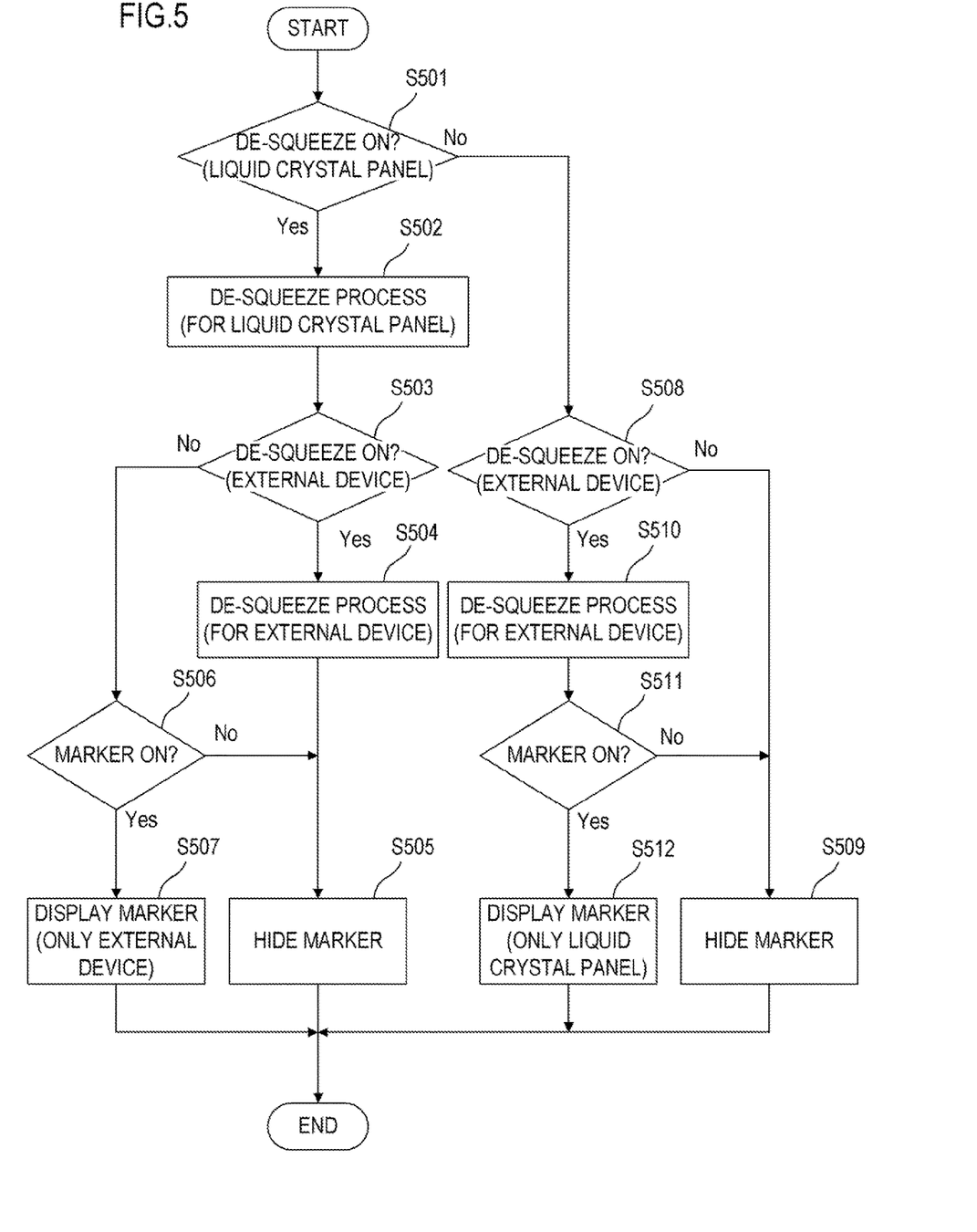
FIG. 5 is a flowchart illustrating an example of processing in the embodiment.

FIG. 5 is a flowchart showing the processing for determining whether or not an anamorphic marker 410 is to be displayed by referring to a de-squeeze state of the image to be output to each output target. Here in this embodiment, the de-squeeze state of the image is either ON or OFF, i.e., whether the de-squeeze setting for the image to be output to each output target is ON (to be de-squeezed) or OFF (not to be de-squeezed).

At S501, the system control unit 108 determines whether or not the de-squeeze setting for the image to be output to the liquid crystal panel 107 is ON. If the de-squeeze setting is ON, the process goes to S502, and if it is not (if the de-squeeze setting is OFF), goes to S508. The de-squeeze setting can be changed by the user operating the menu, and the changed result is stored in a back-up area of the ROM 110.

At S502, the system control unit 108 (resize circuit for display 104) executes the de-squeeze process to the image to be output to the liquid crystal panel 107.

At S503, the system control unit 108 determines whether or not the de-squeeze setting for the image to be output to the external device (via the external output unit 115) is ON. If the de-squeeze setting is ON, the process goes to S504, and if not, goes to S506. Similarly to S501, the de-squeeze setting at S503 can be changed by the user operating the menu, and the changed result is stored in a back-up area of the ROM 110.

At S504, the system control unit 108 (resize circuit for display 104) executes the de-squeeze process to the image to be output to the external device.

At S505, the system control unit 108 causes the anamorphic markers 410 to be hidden in all the output targets, and ends the processing flow.

At S506, the system control unit 108 determines whether or not the anamorphic marker setting is ON. If the setting is ON, the process goes to S507, and if not (OFF), goes to S505. The anamorphic marker setting is the setting of whether or not the anamorphic marker 410 is to be displayed when conditions for displaying the anamorphic marker 410 are satisfied. The user can forcefully hide the anamorphic marker 410 by turning off the anamorphic marker setting.

At S507, the system control unit 108 displays the anamorphic marker 410 as OSD by superposing the marker on the image output to the external device.

This way, when the de-squeeze setting for the image to be output to the liquid crystal panel 107 is ON (valid) while the de-squeeze setting for the image to be output to the external device is OFF (invalid), the anamorphic marker 410 is displayed with the image on the external device. Thus it is made possible to check the valid region of CinemaScope on the external device. When there are at least three output targets, the anamorphic marker 410 may be displayed with the image in all the output targets for which the de-squeeze setting is OFF.

At S508, the system control unit 108 determines whether or not the de-squeeze setting for the image to be output to the external device is ON. If the de-squeeze setting is ON, the process goes to S510, and if not, goes to S509.

At S509, the system control unit 108 causes the anamorphic markers 410 to be hidden in all the output targets, and ends the processing flow.

At S510, the system control unit 108 (resize circuit for display 104) executes the de-squeeze process to the image to be output to the external device.

At S511, the system control unit 108 determines whether or not the anamorphic marker setting is ON. If the setting is ON, the process goes to S512, and if not, goes to S509. The anamorphic marker setting at S511 is the same as the anamorphic marker setting at S506.

At S512, the system control unit 108 displays the anamorphic marker 410 as OSD by superposing the marker on the image output to the liquid crystal panel 107.

This way, when the de-squeeze setting for the image to be output to the external device is ON (valid) while the de-squeeze setting for the image to be output to the liquid crystal panel 107 is OFF (invalid), the anamorphic marker 410 is displayed with the image on the liquid crystal panel 107. Thus it is made possible to check the valid region of CinemaScope on the liquid crystal panel 107.

As illustrated in FIG. 5, when the de-squeeze setting for the image to be output to one destination is ON while the de-squeeze setting for the image to be output to the other destination is OFF, the anamorphic marker 410 is displayed in the output target for which the de-squeeze setting is OFF. Thus it is made possible to check the valid region of CinemaScope also in the output target for which the de-squeeze setting is OFF. The processing of S506 and S511 need not be performed, i.e., the anamorphic marker 410 may be forcefully displayed irrespective of the anamorphic marker setting.

Figure 6:
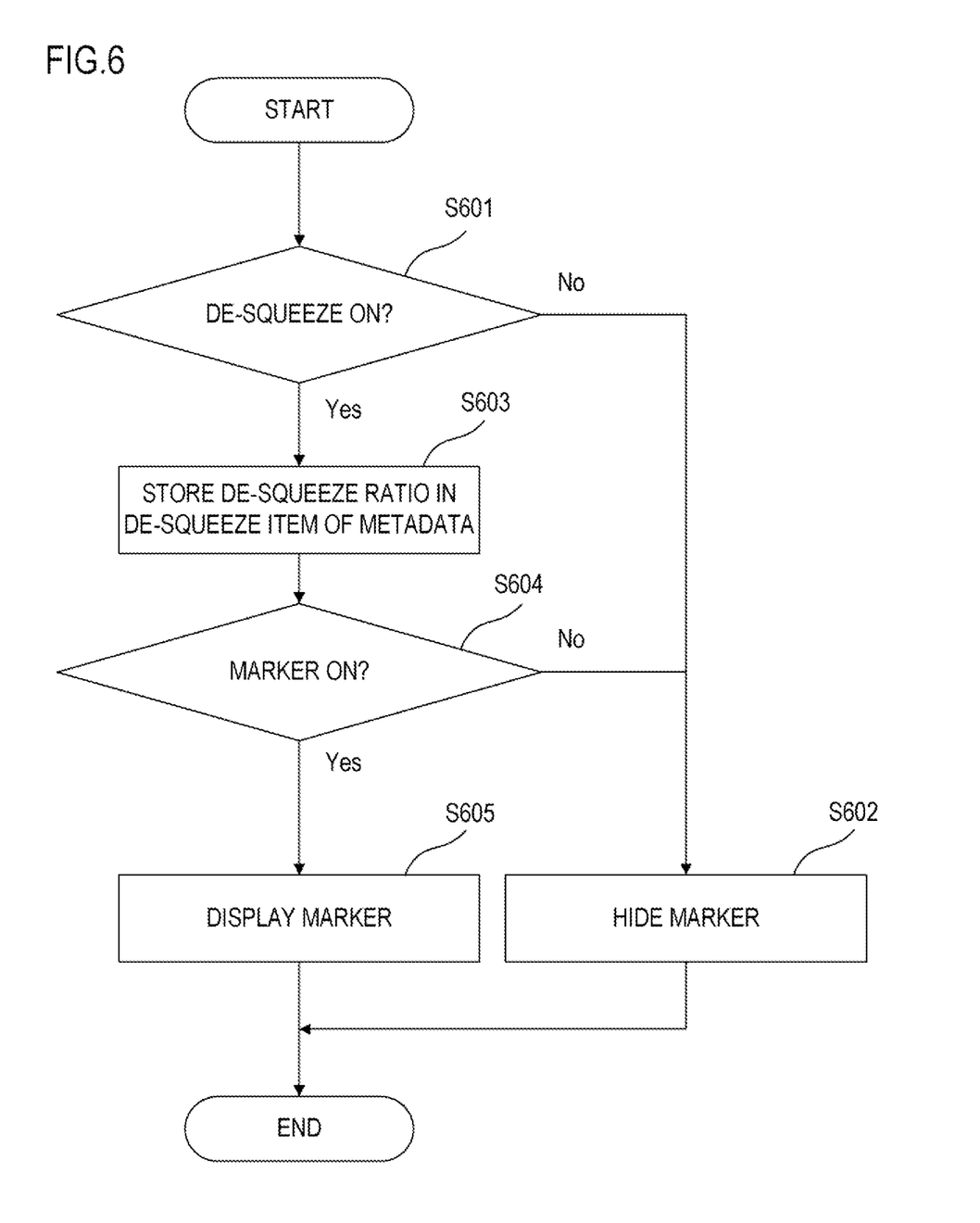
FIG. 6 is a flowchart illustrating an example of processing in the embodiment.

In the processing (FIG. 5) described above, it is determined whether or not an anamorphic marker 410 is to be displayed by referring to the de-squeeze setting (ON or OFF) for the image output to each output target. FIG. 6 is a flowchart showing the processing for determining whether or not an anamorphic marker 410 is to be displayed by referring to information that indicates a de-squeeze ratio. Each step of the processing in this flowchart is realized by the system control unit 108 deploying a program stored in the ROM 110 to the RAM 111 and executing it.

At S601, the system control unit 108 refers to the information indicating the de-squeeze ratio to determine whether the de-squeeze setting is ON or not. If the de-squeeze setting is ON, the process goes to S603, and if not (if it is OFF), goes to S602.

In this embodiment, it is supposed that one of "OFF", "×2.0", and "×1.33", which is the information indicating the de-squeeze ratio, is selected by the user. The system control unit 108 determines that the de-squeeze setting is OFF when "OFF" is selected as the information indicating the de-squeeze ratio. The system control unit 108 determines that the de-squeeze setting is ON when either "×2.0" or "×1.33" is selected as the information indicating the de-squeeze ratio. While the de-squeeze setting (information indicating the de-squeeze ratio) is not linked with the de-squeeze process in this embodiment, the operation of the de-squeeze process for each output target may be linked with the de-squeeze setting. For example, when the de-squeeze ratio is "×2.0", the de-squeeze process of stretching the image two times horizontally may be performed, and when the de-squeeze ratio is "×1.33", the de-squeeze process of stretching the image 1.33 times horizontally may be performed. In this embodiment, the imaging apparatus 100 is able to record meta data in association with the image data (e.g., moving image file), and the meta data is eventually stored with the image data in a recording device such as the memory card 113.

At S602, the system control unit 108 causes the anamorphic markers 410 to be hidden in all the output targets, and ends the processing flow.

At S603, the system control unit 108 stores the de-squeeze setting (information indicating the de-squeeze ratio) in de-squeeze setting information contained in the meta data (setting area).

At S604, the system control unit 108 determines whether or not the anamorphic marker setting is ON. If the setting is ON, the process goes to S605, and if not, goes to S602. The anamorphic marker setting at S604 is the same as the anamorphic marker setting at S506.

At S605, the system control unit 108 displays the anamorphic marker 410 on the liquid crystal panel 107 and external device, and ends the processing flow.

While the anamorphic marker 410 is displayed both on the liquid crystal panel 107 and the external device in the example described with reference to the processing flow of FIG. 6, the anamorphic marker 410 may be displayed in one of the output targets in accordance with the menu settings. Moreover, while the information that indicates the de-squeeze ratio set by the user is used as a reference to determine whether the de-squeeze setting is ON or OFF (whether the anamorphic lens is mounted or not) according to the processing flow shown in FIG. 6, other information may be used for reference. For example, whether the de-squeeze setting is ON or OFF may be determined in accordance with the electronic image stabilization (IS) setting (valid/invalid of shake correction setting for the anamorphic lens). Also, information that indicates whether or not the image is to be squeezed may be received by communication with the lens and whether the de-squeeze setting is ON or OFF may be determined based on this information. When playing back an image that has been captured, whether or not the anamorphic marker 410 is to be displayed may be determined based on the de-squeeze setting information contained in the meta data. It can be understood that the system control unit 108 determines whether or not an anamorphic lens is mounted to the imaging apparatus 100 by determining whether the de-squeeze setting is ON or OFF.

Other variation examples will each be described with reference to FIG. 7A to FIG. 7D.

Figure 7A:
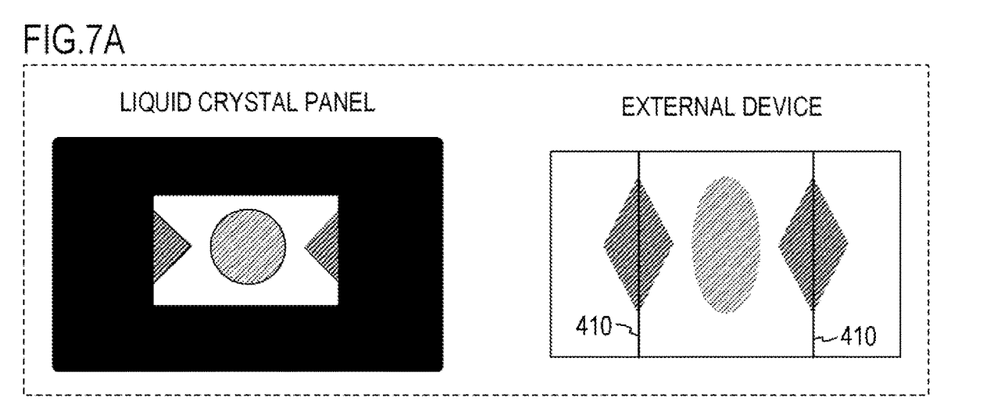
FIG. 7A to FIG. 7D are diagrams illustrating examples of display images according to a modified example of the embodiment.

FIG. 7A illustrates an example in which an image that has been de-squeezed is displayed on the liquid crystal panel 107, and an image that has not been de-squeezed is displayed on the external device. Since the de-squeeze setting of the image to be output to the other destination (liquid crystal panel 107) is ON, the anamorphic marker 410 is displayed as OSD on the external device. On the other hand, a shrunk image with a black frame (de-squeezed image; second image) is shown in the middle of the screen on the liquid crystal panel 107. The area of this shrunk image is the same as that of the image in FIG. 2 (image data 204) and the image 303 in FIG. 3 (image data to be displayed). Such a shrunk image (de-squeezed image) as illustrated in FIG. 7A may be displayed when the image cannot be displayed over the entire screen of the liquid crystal panel 107 due to a system requirements issue or the like.

Figure 7B:
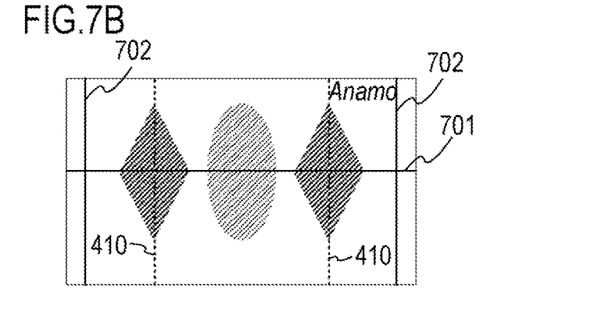
Figure 7C:
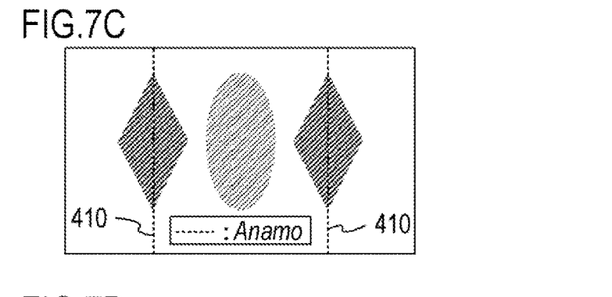

FIG. 7B and FIG. 7C illustrate examples in which anamorphic markers 410 and other markers (guidelines and the like) are displayed in different manners. In FIG. 7B, a center marker 701 (other marker) and aspect markers 702 (other marker) are displayed in addition to the anamorphic markers 410. In the example shown in FIG. 7B, to be distinguished from the center marker 701 and aspect markers 702, the anamorphic markers 410 are displayed as broken lines. Moreover, a text "Anamo" is displayed beside the (right side) anamorphic marker 410.

FIG. 7C illustrates an example in which a guide is provided ("- - - :Anamo") to show that the broken lines indicate anamorphic markers 410 to distinguish them from other markers (not shown). The anamorphic markers 410 may be displayed in manners different from those of other markers as illustrated in FIG. 7B and FIG. 7C. Also, other markers may be forcefully hidden when the anamorphic markers 410 are being displayed. FIG. 7B and FIG. 7C illustrate examples of how to display the anamorphic markers 410. The timing of displaying the markers is the same as that of the embodiment described above.

Figure 7D:
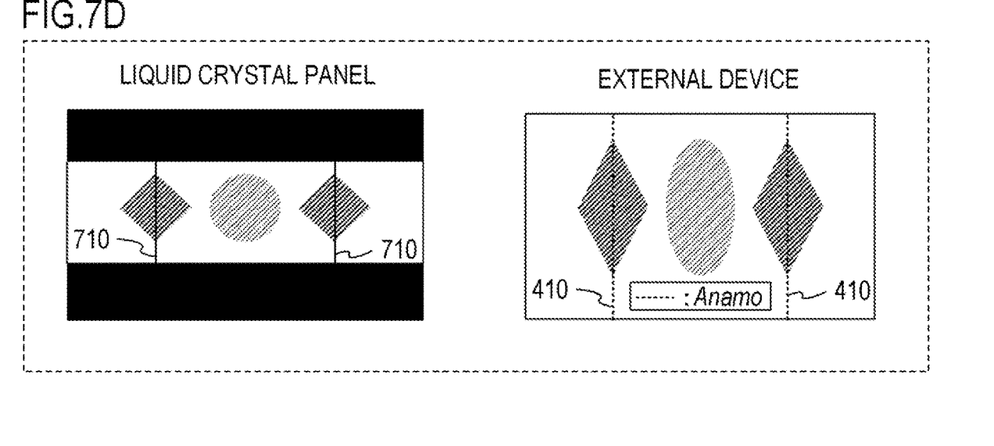

FIG. 7D illustrates an example in which an image that has been de-squeezed (second image) is displayed on the liquid crystal panel 107, and an image that has not been de-squeezed is displayed on the external device. Since the de-squeeze setting for the image to be output to the other destination (liquid crystal panel 107) is ON, the anamorphic markers 410 are displayed as OSD on the external device. On the other hand, an image that is shrunk in the up and down direction (vertically) is shown on the liquid crystal panel 107. The reduction rate in the up and down direction corresponds to the squeeze ratio of the lens, so that the display of the anamorphic markers 710 (second item) indicating the region having an aspect ratio of 2.39:1 together with the shrunk image allows the user to understand the valid region of CinemaScope. The anamorphic markers 410 and 710 may be displayed as OSD with images in this way both on the liquid crystal panel 107 and external device when de-squeezing is performed by shrinking the image vertically. Alternatively, when the shrunk image is displayed on the liquid crystal panel 107, as well as the anamorphic markers 710 are displayed, the anamorphic markers 410 may be displayed in the external device.

While one example of anamorphic markers that indicate the valid region of CinemaScope having an aspect ratio of 2.39:1 after being de-squeezed has been described in this embodiment, the region (area) indicated by the anamorphic markers is not limited to this. For example, the anamorphic markers may indicate a region which, after being de-squeezed, will have an aspect ratio of 2.35:1, 16:9, 4:3, 1:1, and so on.

Displaying anamorphic markers on the image that has not been de-squeezed as described above allows for easy recognition of which region (area) of the image will be the valid region of CinemaScope when de-squeezed. This enables the user to film (to perform filming operations including camera framing, deciding where actors should stand, etc.) while checking the visible region of the final shooting product. Moreover, linking the condition on which it is determined whether to display anamorphic markers with the de-squeeze state allows the user to easily check the valid region of CinemaScope when de-squeezed without considering the de-squeeze ratio. The valid region of CinemaScope can also be understood as an area that will fit with a predetermined aspect ratio when de-squeezed.

In this embodiment, when the de-squeeze setting is turned on for any of the plurality of output targets, the anamorphic markers are automatically displayed in other destinations for which the de-squeeze setting has been turned off. This allows for display suited to the anamorphic lens (display of anamorphic markers) in a plurality of output targets without the setting operation for discrete output targets. Namely, display suited to the anamorphic lens can be made in multiple output targets with less troublesome setting operation.

Moreover, according to this embodiment, even when it is not known whether or not the mounted lens is an anamorphic lens, the imaging apparatus can determine that an anamorphic lens is mounted when the user gives an instruction to perform the de-squeeze process for one output target. Therefore, display suited to the anamorphic lens can be made in other output targets, too. Namely, even when it is not known whether or not the mounted lens is an anamorphic lens, display suited to the anamorphic lens can be made in multiple output targets with less troublesome setting operation.

Various control processes described above that are performed by the system control unit 108 may be carried out by one hardware system, or, a plurality of hardware units (e.g., a plurality of processors and circuits) may share the processing and achieve overall control of the apparatus. For example, the aspect of the embodiments can also be interpreted as an electronic device that includes a display control unit that provides an indicator for identifying an area of a predetermined post de-squeeze aspect ratio in an image captured by an image capturing unit and not de-squeezed yet. The identification indicator in this case does not have the predetermined aspect ratio.

While the disclosure has been described in detail on the basis of exemplary embodiments thereof, the aspect of the embodiments is not limited to these specific embodiments, and various other modes within the scope of the subject matter of this disclosure shall be included in this disclosure. Further, various features described above merely show one embodiment of the disclosure and these various features may be combined in various manners.

While one example in which the disclosure is applied to an imaging apparatus has been described in the embodiment above, the disclosure is not limited to this example and can be applied to any electronic device that controls the display of images captured by an image capturing unit. Namely, the aspect of the embodiments is applicable to personal computers, PDA, mobile phone terminals, portable image viewers, printer devices with a display, digital photo frames, music players, game machines, electronic book readers, and so on.

The aspect of the embodiments is not limited to an imaging apparatus itself but also applicable to a control unit that remotely controls an imaging apparatus (including a network camera) by communicating therewith via wired or wireless communication. Devices that remotely control imaging apparatuses include, for example, smart phones, tablet PCs, desktop PCs, and so on. Imaging apparatuses can be controlled remotely by notifying commands from the control unit based on the operations or processing performed on the control unit side for causing the imaging apparatuses to perform various operations and settings. It is also possible to receive live view images captured by the imaging apparatus via wired or wireless communication and display the images on the control unit side.

The disclosure is realized also by executing the following processing, which includes supplying the software (program) that realizes the functions of the embodiment described above to a system or an apparatus via a network or various memory media, and reading out and executing program codes by a computer (or CPU, MPU, etc.) of the system or apparatus. In this case, the program and the memory medium storing this program constitute the aspect of the embodiments.

The aspect of the embodiments enables the user to recognize the predetermined area of a post de-squeeze image when outputting an image that is not de-squeezed.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-003627, filed on Jan. 14, 2020, which is hereby incorporated by reference herein in its entirety.

What is claimed is:

1. An apparatus comprising:
    at least one processor; and
    a memory coupled to the at least one processor, the memory having instructions that, when executed by the processor, perform operations as:
    a controller configured to display a first item with a first image, which is captured by a capturing unit and is not de-squeezed,
    wherein the first item indicates a region of the first image corresponding to a region of a second item which indicates a region having a predetermined aspect ratio of a second image obtained by de-squeezing the first image, and
    wherein the first item is displayed to an output target, to which an image that is not de-squeezed is to be output, among a plurality of output targets in a case where the second item is displayed with a de-squeezed image.

2. The apparatus according to claim 1, wherein the region indicated by the first item does not have the predetermined aspect ratio.

3. The apparatus according to claim 1, wherein the capturing unit is mounted an anamorphic lens and obtains the first image which is squeezed by compressing optical image of an object when capturing the object image.

4. The apparatus according to claim 1, wherein the controller is further configured to display the first item with the first image on a display in a case where the image, that is captured and that is to be output to other output target than the display, is set to be de-squeezed.

5. The apparatus according to claim 1, wherein
    the at least one processor further performs operations as:

a shrink unit configured to shrink an image in a vertical direction to obtain a de-squeezed image.

6. The apparatus according to claim 1, wherein the at least one processor further performs the operations of the following unit:
a setting unit configured to set whether or not the first item is to be displayed in accordance with an instruction from a user.

7. The apparatus according to claim 1, wherein the controller is further configured to display a guide indicating that the first item is showing a region of a predetermined aspect ratio in a case where the first item is being displayed.

8. The apparatus according to claim 1, wherein the controller is further configured not to display another item indicating a region having an aspect ratio different from the predetermined aspect ratio in a case where the first item is being displayed.

9. The apparatus according to claim 1,
wherein the at least one processor further performs operations as:
a determination unit configured to determine whether or not an anamorphic lens is mounted, and
wherein the controller is further configured to display the first item in a case where the anamorphic lens is mounted.

10. The apparatus according to claim 9, wherein the determination unit is further configured to determine whether or not an anamorphic lens is mounted based on information indicating a de-squeeze ratio set by a user.

11. The apparatus according to claim 9, wherein the determination unit is further configured to determine whether or not an anamorphic lens is mounted in accordance with whether or not a shake correction setting for an anamorphic lens is made.

12. The apparatus according to claim 9, wherein the determination unit is further configured to determine whether or not an anamorphic lens is mounted based on information acquired through lens communication indicating whether or not an image is to be squeezed.

13. A method comprising:
acquiring a first image which is captured by a capturing unit and is not de-squeezed, and
displaying a first item with the first image wherein the first item indicates a region of the first image corresponding to a region of a second item which indicates a region having a predetermined aspect ratio of a second image obtained by de-squeezing the first image,
wherein the first item is displayed to an output target, to which an image that is not de-squeezed is to be output, among a plurality of output targets in a case where the second item is displayed with a de-squeezed image.

14. The method according to claim 13, wherein the region indicated by the first item does not have the predetermined aspect ratio.

15. The method according to claim 13, wherein the capturing unit is mounted an anamorphic lens and obtains the first image which is squeezed by compressing optical image of an object when capturing the object image.

16. The method according to claim 13, further comprising displaying the first item with the first image on a display in a case where the image, that is captured and that is to be output to other output target than the display, is set to be de-squeezed.

17. The method according to claim 13, further comprising: shrinking an image in a vertical direction to obtain a de-squeezed image;
displaying the first item to an output target.

18. The method according to claim 13, further comprising:
determining whether or not an anamorphic lens is mounted; and
displaying the first item in a case where the anamorphic lens is mounted.

19. The method according to claim 13, further comprising displaying a guide indicating that the first item is showing a region of a predetermined aspect ratio in a case where the first item is being displayed.

20. A non-transitory computer-readable storage medium storing a program for causing a computer to execute:
a method comprising:
acquiring a first image which is captured by a capturing unit and is not de-squeezed, and
displaying a first item with the first image wherein the first item indicates a region of the first image corresponding to a region of a second item which indicates a region having a predetermined aspect ratio of a second image obtained by de-squeezing the first image,
wherein the first item is displayed to an output target, to which an image that is not de-squeezed is to be output, among a plurality of output targets in a case where the second item is displayed with a de-squeezed image.

* * * * *